J. CALCATERRA.
SAFETY DEVICE FOR THE CLUTCH CONTROLLING MEANS OF AUTOMOBILES.
APPLICATION FILED DEC. 20, 1919.

1,363,083.

Patented Dec. 21, 1920.

WITNESSES

INVENTOR
J. CALCATERRA
BY
ATTORNEYS

UNITED STATES PATENT OFFICE.

JOSEPH CALCATERRA, OF NEW YORK, N. Y., ASSIGNOR OF ONE-THIRD TO RICHARD J. CRUICE AND ONE-THIRD TO ANDREW J. FINNERTY, BOTH OF NEW YORK, N. Y.

SAFETY DEVICE FOR THE CLUTCH-CONTROLLING MEANS OF AUTOMOBILES.

1,363,083.   Specification of Letters Patent.   Patented Dec. 21, 1920.

Application filed December 20, 1919. Serial No. 346,427.

*To all whom it may concern:*

Be it known that I, JOSEPH CALCATERRA, a citizen of the United States, and a resident of the city of New York, borough of the Bronx, in the county of Bronx and State of New York, have invented a new and Improved Safety Device for the Clutch-Controlling Means of Automobiles, of which the following is a description.

My invention relates to a means to prevent an automobile from accidentally creeping forward or running away when the crank is turned for starting. In a certain make of automobile a safety device is employed, to wit: The controller shaft has a device fixed thereon and termed a speed lever presenting an arcuate surface and the clutch lever has a screw thereon adapted to engage the arcuate surface of said speed lever when the latter is thrown into position with the turning of the controller shaft through the medium of the brake lever thereon in applying the brake so that the clutch spring can not accidentally throw in the high gear. With the device referred to, the speed lever is thrown to the release position with the throwing down of the brake lever to the release position, leaving the clutch lever free to move since the screw thereon is not then opposed by the curved surface of the speed lever.

The general object of my invention is to provide a safety device of the indicated character in which the coacting members on the controller shaft and on the clutch lever will be so constructed and arranged that they will be set or brought into locking position by the putting on of the brake but which will not be released by the release of the brake.

A further object of the invention is to cause the release of the safety device only by the deliberate throwing of the clutch lever into the low speed position.

Again, in the operation of the automobiles in question since the speed lever so called is in set position only when the brake is applied any attempt to push the car is opposed by the brake pressure. An important object of my invention is to provide for permitting the release of the brake while maintaining the safety device set, thereby permitting of the automobile being pushed with slight effort unopposed by brake pressure, at the same time insuring that the clutch spring can not automatically throw the clutch from netural position.

More specifically, the invention has for an object to provide for embodying the invention in forms adapted to either automobiles already made and in use or in the automobiles in the factory.

The present invention is more particularly intended as an improvement on the device for the indicated purposes forming the subject matter of an application for patent filed by me September 10, 1919, Serial No. 322,771, and has for its particular object to provide stop means to prevent the accidental throwing of the safety device by bumping or jolting of the automobile, to a position to be not operable with the application of the brake, a more specific object being to provide an improved arrangement of weight means normally tending to restore the safety device to an inoperative position after an operation thereof, as well as to utilize one of the stop elements as the weight means.

The stated objects and others as will appear are attained by a safety device having the novel features and appurtenances hereinafter particularly described and defined in the claims.

Reference is to be had to the accompanying drawings forming a part of this specification, it being understood that the drawings are merely illustrative of examples of the invention.

Figure 1:
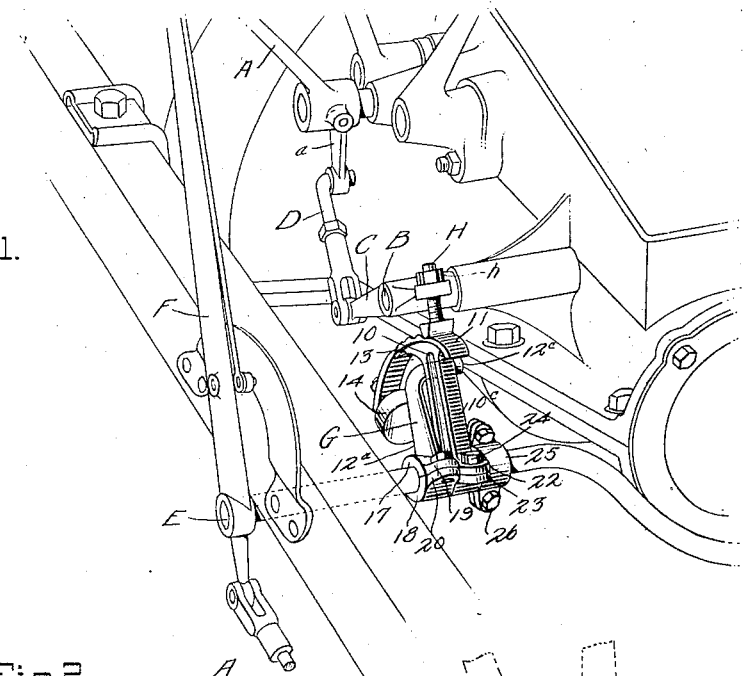
Figure 1 is a perspective view of parts of an automobile having my invention applied thereto.

In the illustrated example, A indicates the clutch lever of an automobile of known make and to which my invention is particularly applicable, and *a* indicates an arm thereon which is adapted to rock the clutch shaft B which has a lever C thereon, one arm of which is connected with the arm *a* of the clutch lever through connections D. The letter E indicates the controller shaft having the brake lever F. In automobiles of the type referred to the clutch spring (not shown) automatically throws the clutch into high gear when the foot pressure of the driver is removed from the pedal (not shown) of the clutch lever and in order to prevent the high gear from being thrown in by the clutch spring, a safety device is provided including an element G on the controller shaft E, said element being usually termed a speed lever and adapted to be swung to the set position by turning of shaft E by lever F in the action of applying the brake.

Safety element G in the form generally employed in the automobile of the type referred to, is formed with a head presenting an arcuate cam surface. To coact with the element G a screw H is provided extending through the free arm of the lever C and having a set nut $h$ for adjusting the screw, the arrangement being such that when the clutch lever A is moved to the neutral position of the clutch the screw H will contact with the head of the element G so that said head offers a barrier to the screw H and thereby prevents movement of the clutch shaft B to the high gear position. The element G is fast on the controller shaft E and therefore, when the brake lever F is thrown down to the position to release the brake, the element G is swung away from the screw H leaving the clutch shaft B free to move to the high gear position, so that the arrangement permits of the accidental throwing in of the high gear when the engine is cranked and the brake released. Furthermore, if it is desired to move the automobile a short distance by pushing, for example, when the safety device is in set position and the brake therefore applied, the brake pressure opposes the movement of the automobile and therefore a considerable energy is required to overcome the brake pressure in pushing the automobile.

The above described elements and their described characteristics are well known in the type of automobile in question, the only distinction being that the safety element G is modified in the particulars as will appear in carrying out my present invention.

In accordance with my invention, a safety device is provided involving an element 10 adapted to be loosely applied to the controller shaft E adjacent to the safety element G to coact with the latter and with the screw H. At the top of said element 10 is an arcuate head 11 and preferably and advantageously, said head presents at its upper surface a series of depressions 13 to receive the end of the screw H to effect a positive interlock between said screw and said element 10 when the safety device is in the set position. The plurality of depressions 13 is provided to insure the engagement of the screw H with the element 10 if the latter be moved through an increased arc as the brake surfaces wear. The relation of the element 10 to the safety device G is such that said safety device G will carry the element 10 to a position to be engaged by the screw H when the clutch lever A is in the neutral position. For the stated purpose said element G in the present example of my invention is in the form of an arm 12$^a$ having a laterally disposed terminal 12$^c$ extending into the plane of the element 10 to rock the latter and carry it to the set position with the application of the brake, that is to say, when the controller shaft E is turned to a position to apply the brake, the terminal 12$^c$ will engage the element 10 and bring the head 11 thereof beneath the screw H which occurs when the clutch lever A is in the neutral position, the general action being the same as fully explained in my aforenamed application in which the present form of the element G is also disclosed.

Figure 2:
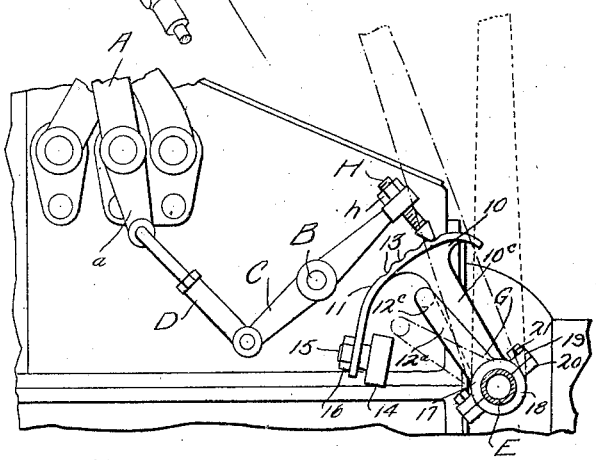
Fig. 2 is a partly sectional end view of the parts shown in Fig. 1, showing the safety device in action.

Should the automobile equipped with the element 10 receive a violent jolt or jar as in dropping into a rut or striking a bump in the road, the looseness of the element 10 on the controller shaft E makes it possible that said element will be accidentally rocked forwardly to a position at the opposite side of the shaft E, and thus inoperative by arm 12$^a$ and to prevent this, I provide, in the present invention, stop means consisting of a member, 14, rigid with the element 10 to partake of the movements thereof. Said member 14 is so positioned on the head 11 that the lateral terminal 12$^c$ of element G will extend beneath the head 11 and between said member 14 and the shank 10$^c$ of element 10. With the described arrangement when the controller shaft E is turned to apply the brake it will, as described, cause terminal 12$^c$ to engage the shank 10$^c$ and carry the element 10 to set position which occurs when the pedal A is thrown to the neutral position of Figs. 1 and 2. The brake lever F may, however, now be thrown down to turn the controller shaft E for releasing the brake, thereby carrying the element G with it to the release position indicated in dotted lines in Fig. 2, but the safety device remains in set position with the element 10 engaged and locked by the screw H and therefore, although the brake is released the clutch cannot be thrown to the high gear position by the clutch spring until the pedal lever A with its clutch controlling arm $a$ is deliberately moved to the low gear position of Fig. 3 which thereby disengages the screw H from head 11 of element 10, thus releasing said element.

Figure 3:
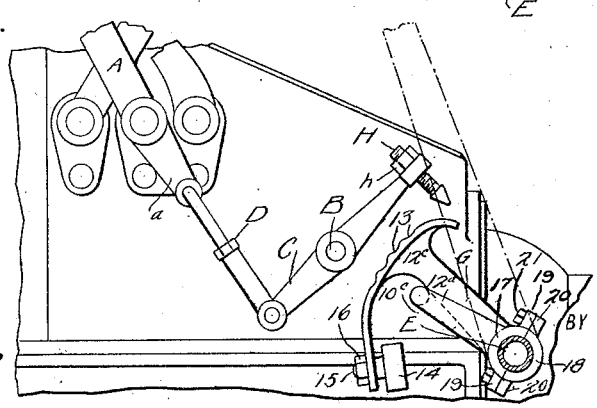
Fig. 3 is a view similar to Fig. 2, but showing the safety device released and out of action.

When said element 10 is in the release position as in Fig. 3 any movement of the same toward set position will be limited by the member 14 striking the terminal 12$^c$ and thus the safety device cannot accidentally be caused to swing through an arc past a vertical line passing through its center of movement, but will be constrained to remain in position to be actuated by said terminal 12ᶜ when the brake is applied.

In the present example of my invention, I utilize the stop member 14 also as a weight automatically functioning to carry the element 10 to the release position of Fig. 3 when disengaged from the screw H. Said member 14 in the present instance is formed with a threaded shank 15 passing through the head 11 at its rear end and receiving a nut 16.

The means by which the elements G and 10 are mounted on the controller shaft E will in practice vary according to whether the invention is embodied in the automobile at the factory or is to be applied as an attachment to automobiles that have left the factory. In the illustrated form said elements are detachably clamped to said shaft, the element G having an integral clamp member 17 presenting a concave depression and there being a coacting detachable clamp member 18, the two being adapted to jointly embrace the shaft E, ears 19 and 20 on the respective members 17, 18 receiving clamp bolts 21. Similarly, the shank 10ᶜ of element 10 has clamp members 22, 23, the ears of which receive clamp bolts 24. A collar 25 is provided in the illustrated form for application to the shaft E at the opposite side of element 10 on the element G, thereby holding said element 10 against longitudinal displacement on shaft E while leaving it free to have rocking movement on said shaft or to be moved by the latter. Said collar 25 in the present example is in the form of a two-part clamp, the members of which are secured by bolts 26 so that the collar may be applied to the shaft E after the automobile has left the factory.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A safety device of the indicated character comprising an element movable to and from locking position with the movements of the clutch lever, and a coacting element adapted to be thrown to a position to be engaged by the first-mentioned element by the turning of the controller shaft in the movement of applying the brake and permitting the reverse movement of the controller shaft without releasing said coacting member; together with stop means to prevent independent movement of said coacting element away from a position to be operated by the turning of the controller shaft.

2. The combination with the clutch shaft of a motor-driven vehicle and the controller shaft thereof, of a safety device including an element movable to and from the operative position with the turning of the clutch shaft, a coacting element, and means on the controller shaft to partake of the movement thereof adapted to move said coacting element into a position to be engaged by the first mentioned element with the turning of the controller shaft to a position of applying the brake, said means being movable in the reverse direction independently of said coacting element with the reverse movement of the controller shaft in releasing the brake; together with a stop member on said coacting element to partake of the movements thereof and in position to engage said means and constrain said coacting element to maintain a position to be engaged by said means and moved thereby into engagement with the first element 3. A safety device of the indicated character for use on motor driven vehicles and including an element adapted to be mounted to be moved to or from the operative position with the movements of the clutch lever, a second element to coact with the first element, setting means for said coacting element adapted to be mounted to partake of the movements of the controller shaft of the vehicle in applying and releasing the brake, means to mount said coacting element to be moved by said setting means to a position to be engaged by the first element and to move to reverse position independently of said setting means, said setting means being adapted to have reverse movement independently of said coacting element upon reverse movement of the controller shaft in the release of the brake, and a stop member on said coacting element to partake of the movements thereof and positioned to engage said setting means and constrain said coacting element to maintain a position to be engaged by said means and moved thereby into engagement with the first element.

4. In a safety device for use on motor driven vehicles and involving an element adapted to be moved to and from set position with a movement of the clutch lever of the vehicle; a coacting element and setting means for throwing said coacting element to set position, said coacting element and said setting means being adapted for independent reverse movement, means to mount said setting means to actuate said coacting element with the movement of the controller shaft of the vehicle in applying the brake and to move away from said coacting element with a movement of the controller shaft to release the brake, and a stop member on said coacting element to partake of the movements thereof and in position to engage said setting means and constrain said coacting element to maintain a position to be engaged by said means and moved thereby into engagement with the first element.

5. In a safety device for use on motor driven vehicles and involving an element adapted to be moved to and from set position with a movement of the clutch lever of the vehicle; a coacting element and setting means for throwing said coacting element to set position, said coacting element and said setting means being adapted for independent reverse movement, means to mount said setting means to actuate said coacting element with the movement of the controller shaft of the vehicle in applying the brake and to move away from said coacting element with a movement of the controller shaft to release the brake, and a stop member on said coacting element to partake of the movements thereof and in position to engage said setting means and constrain said coacting element to maintain a position to be engaged by said means and moved thereby into engagement with the first element, said stop member constituting a weight tending to return the coacting element to release position.

6. A safety element to coact with the safety element movable on automobiles with the rocking of the clutch shaft, said first-mentioned element having means to mount the same loosely on the controller shaft of the automobile, and setting means to swing said first element to the set position, said setting means being adapted to be fixedly secured to said controller shaft; together with a stop member on said first-mentioned element in position to engage said setting means and constrain said coacting element to maintain a position to be engaged by said means and moved thereby into engagement with the first element.

7. A safety element to coact with the safety element movable on automobiles with the rocking of the clutch shaft, said first-mentioned element having means to mount the same loosely on the controller shaft of the automobile, and setting means to swing said first element to the set position, said setting means being adapted to be fixedly secured to said controller shaft; together with a weight on said first-mentioned element normally tending to move the same to release position and positioned to engage said setting means and prevent accidental movement of said first-mentioned element beyond the range of movement of the setting means when the controller shaft is operated.

8. A safety element to coact with the safety element movable on automobiles with the rocking of the clutch shaft and adapted to be mounted on the automobile, and setting means for said first-mentioned element adapted to be mounted on the automobile to partake of the movements of the controller shaft and actuate said first-mentioned element for moving the same to set position with the turning of the controller shaft for applying the brake of the automobile, and to have reverse movement independently of said first-mentioned element with the turning of the controller shaft to position for releasing the brake, and stop means on said first-mentioned element in position to contact with said setting means and limit the independent movement of said first-mentioned element in a direction away from its normal release position.

9. For use with the safety element of the class described provided on certain motor-driven vehicles and movable to and from set position with the movement of the clutch lever from and to low gear position: an element to coact with said first element, and an actuating device for the latter, said coacting element being adapted to be mounted for movement by said actuating device in one direction for carrying it to set position to coact with the first element, and said actuating device being reversibly movable independent of said coacting element; together with means to mount the actuating means to be dependent on the turning movement of the controller of the automobile in the application and release of the brake, said coacting element furthermore having a head and a stop member on said head and spaced from the body of said element, said actuating device presenting a member disposed between said stop member and body for vibration in said space forward and back in the actuating and reverse movements of said device so that said member of said coacting element is adapted to contact with said member of the actuating device and limit the independent movement of said coacting element toward the set position from release position.

JOSEPH CALCATERRA.